United States Patent [19]
Ruder

[11] 3,938,875
[45] Feb. 17, 1976

[54] SIGHT FOR USE ON HAND FIREARMS AND A METHOD OF USING IT

[76] Inventor: Nils Inge Algot Ruder, Erik Dahlbergsgatan 11, 211 48, Malmo, Sweden

[22] Filed: Oct. 13, 1969

[21] Appl. No.: 868,282

Related U.S. Application Data

[63] Continuation-in-part of Ser. No. 830,566, May 9, 1969, abandoned, and a continuation-in-part of Ser. No. 789,627, Oct. 18, 1968, abandoned, and a continuation of Ser. No. 495,094, Oct. 12, 1965, abandoned.

[52] U.S. Cl. ............................... 350/10; 250/467
[51] Int. Cl.² ............................................ G02B 27/32
[58] Field of Search ........ 350/10; 250/71, 458, 459, 250/462, 467; 33/50.5, 47, 46.5, 50 A

[56] References Cited
UNITED STATES PATENTS

| | | |
|---|---|---|
| 1,256,987 | 2/1918 | Dittemore ............................ 33/47 |
| 2,472,809 | 6/1949 | Decker ............................ 350/10 X |
| 2,488,541 | 11/1949 | Holme ............................... 250/71 |
| 2,727,309 | 12/1955 | Jenkins .................................. 33/52 |
| 2,780,130 | 2/1957 | Mauer .............................. 33/52 X |
| 2,925,657 | 2/1960 | Stenky ............................ 33/52 X |
| 3,213,539 | 10/1965 | Burris .............................. 350/10 X |
| 3,297,389 | 1/1967 | Gibson ............................... 350/10 |
| 3,320,671 | 5/1967 | Rickert et al. .................. 350/10 X |
| 3,362,074 | 1/1968 | Luebkeman et al. ......... 350/10 UX |

*Primary Examiner*—Davis L. Willis
*Attorney, Agent, or Firm*—Jones, Tullar & Cooper

[57] ABSTRACT

A sighting device for a firearm to be used with both eyes open is provided, wherein a tubular housing, open at the end nearest the shooter, includes means for forming a virtual image of a small luminous spot. When viewed by the shooter, the spot appears to be at infinity. Means are provided to adjust the position of the spot within the housing.

21 Claims, 11 Drawing Figures

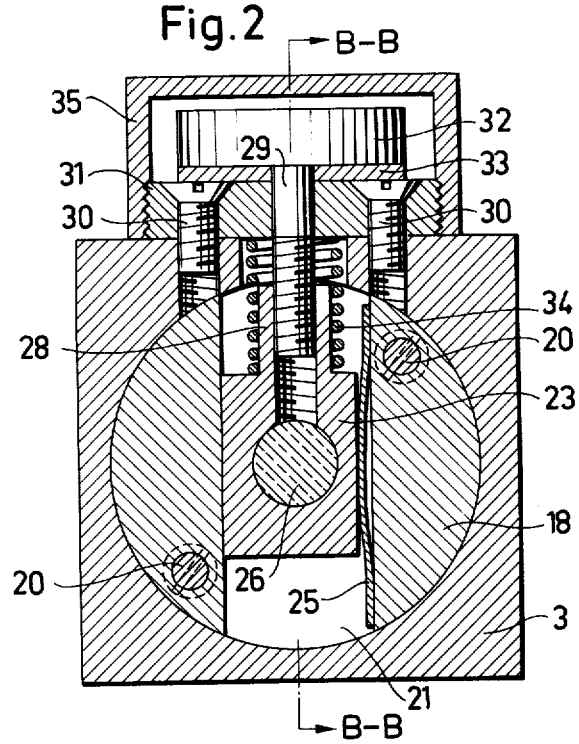
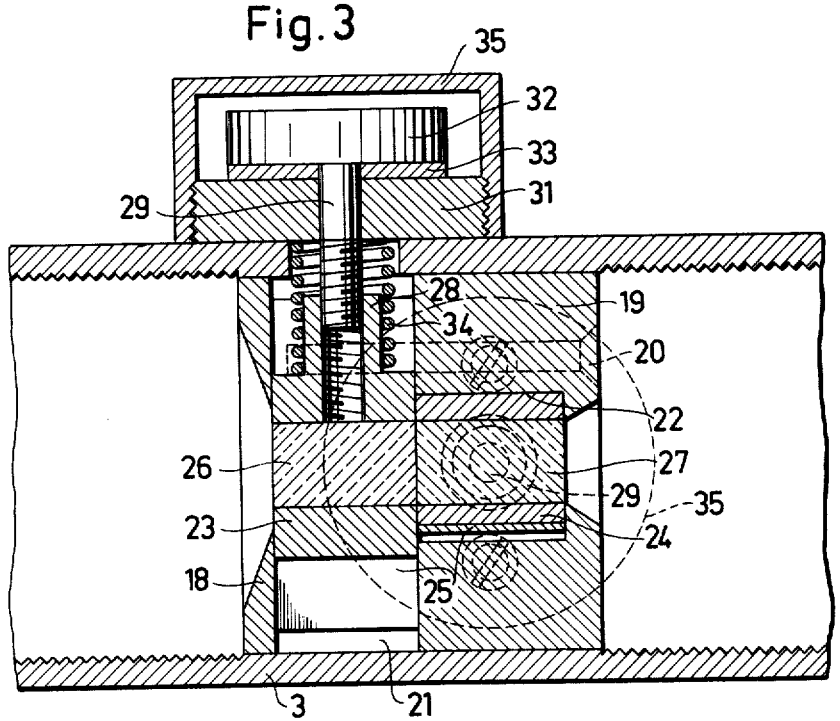

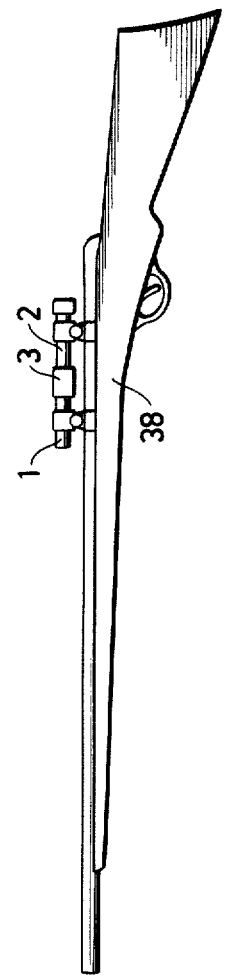
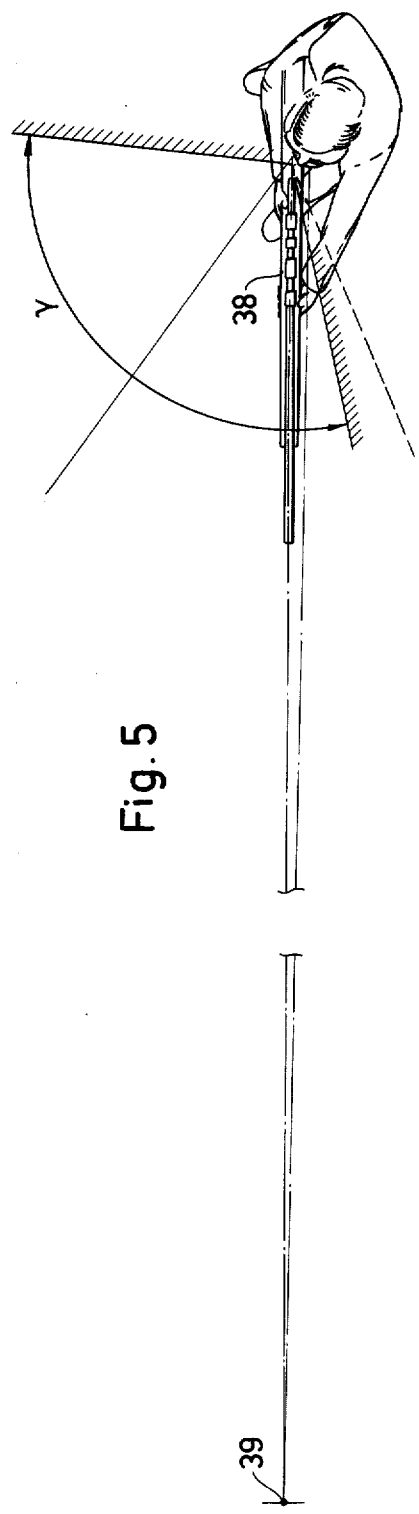

SIGHT FOR USE ON HAND FIREARMS AND A METHOD OF USING IT

CROSS-REFERENCE TO RELATED APPLICATIONS

The present invention relates to a sight for use on firearms and is a continuation-in-part of pending patent application Ser. No. 830,566, filed May 9, 1969 and now abandoned as a continuation-in-part of patent application Ser. No. 789,627, filed Oct. 18, 1968, now abandoned, as a continuation of patent application Ser. No. 495,094, filed Oct. 12, 1965, now abandoned.

BACKGROUND OF THE INVENTION

The sight according to the invention is intended to be used instead of open sights of the conventional type which are mounted on such weapons, and has for its purpose to simplify the aiming procedure, to facilitate target practising by using a simpler aiming method which is easy to learn, and to increase the percentage of hits when firing at mobile targets in daylight and at all kinds of targets in darkness. The sight according to the invention is intended to be used according to the same principle as open sights, i.e., by finding the aiming-line over the sights, contrary to what is the case with optical sights, where the target is observed through a telescope or another similar optical instrument giving an enlarged image of the target, whereupon the aiming proper is done with the aid of e.g. crosshairs or other suitable markings on the sight.

SUMMARY OF THE INVENTION

The primary characteristic feature of the sight according to the invention is that it comprises a housing which is adapted to be mounted on a weapon and has an opening directed towards the shooter and located in such a way that when aiming the weapon the shooter can look into the opening with one eye. Means are enclosed in the housing for generating a luminous spot, and a convergent lens means which is mounted in the path of the light beam passing from the generated luminous spot to the opening is adjusted in such a way that the shooter can see the luminous spot through the said opening in the same way as if it were located at an infinite distance in front of him. The sight is adapted to be adjusted in such a way in relation to the weapon that the luminous spot seems to lie in a target observed by the shooter when the weapon is being aimed at the said target.

The sight according to the invention differs from other sights, both open and optical ones, in that the shooter at the aiming of the gun with the aid of the present sight, sees a luminous spot with that eye with which the target is observed over open sights of the conventional type, the said spot occupying a position in relation to the target which is desired by the shooter. Although some shooters use both eyes in aiming a firearm, many shooters close one eye when using either optical or open sights. The use of a luminous spot device such as that provided by the invention permits the shooter to use the same eye to aim and to observe the whole or a major portion of the target area during the firing. The visual angle is consequently increased in comparison to that obtained when other kinds of sights are used, in particular in those cases when the shooter keeps both eyes open, for in those cases the target area is not screened downward by parts of the weapon or by the sight or, towards one side, by the shooter's nose. This makes it easier to aim at a mobile target with the correct presetting angle, and also makes it possible to switch the fire quickly to more dangerous targets. The sight according to the invention consequently improves the tactical usefulness of the weapon and makes it easier to distribute the fire correctly over the target area. Due to the facility with which even untrained shooters will discover the luminous spot and measure its position in relation to the target, the aiming method is considerably simplified and target practising is facilitated to a corresponding degree, for an important part of training marksmen consists in teaching them how to find the aiming-line and how to choose the right spot in relation to the target against which to aim the weapon.

When used in darkness the sight according to the invention has very great advantages in comparison to previous types of sights. Sights for shooting in darkenss are either open sights, which are mounted on the weapon specifically for fighting in darkness and consist of lugs or the like with fluorescentspots of varying form and appearance, or of sights using the principle of infrared radiation (IR sights). The latter have the disadvantage of being easy to detect through IR reconnaissance, thus revealing the presence of weapons and troops. They are also complicated and expensive and rather difficult to handle and quite cumbersome when used in connection with musketry, and are also very delicate to handle and therefore unsuitable for field use. The former kinds of sights are impractical in use and have the disadvantage of making it necessary to direct the aiming-line into the target, which has for its result that in darkness the target seems to disappear because of the way in which the eyes function. In order to retain the image or outline of an object in darkness it is necessary to direct the gaze slightly beside the object, and firing at targets in darkness over open sights cannot, therefore, be done with any considerable degree of precision.

Contrary to this, the sight according to the invention, in addition to its uncomplicated construction, has the advantage when used as a darkness sight that in the event that the shooter aims the weapon with both eyes open and without seeking the aiming-line over the rear sight and the front sight and instead places the luminous spot in a certain relation to the target, he can direct his gaze slightly beside the target and thus retain its image on the retina, at the same time as quick aiming of the weapon is considerably facilitated.

By using the aiming method described above the shooter can keep both eyes accommodated for aiming at a distance from the very moment when aim is taken and until the firing begins, whereas when using conventional open sights the weapon has first to be aimed and the eye thereupon accommodated from the target to the rear sight, from the rear sight to the front sight, and finally back to the target. By avoiding this aiming method when using the sight according to the invention, the target itself and the whole target area can be kept under observation throughout the firing, even under rapid fire and irrespective of whether this fire consists of rapid nonautomatic fire or of bursts of fire from an automatic weapon. This makes it possible also for untrained shooters to adjust the aim quickly.

Another advantage of the sight according to the invention is that it does not require that the eye observing the luminous spot has to be kept exactly on the optical axis. If the eye is moved slightly to the side of this axis, the apparent position of the luminous spot will not, despite this, change in relation to the target, and this spot can therefore be said to be practically parallax-free.

The size, shape, brightness and color of the luminous spot is of great importance to the construction of the sight, in order to assure a proper response by the eye of the user. As has been stated, the sight is used with both eyes open and focussed on the target, and the weapon bearing the sight is moved into the line of vision of one of the eyes; for example, the right eye. The left eye then continues to see the target, while the right eye looks into the sight housing and views the spot. If the luminous spot is not of proper size and intensity with respect to the outside light conditions, the eyes will not remain coordinated and the spot will either disappear or the eyes will attempt to focus on the spot instead of on the target. On the other hand, the proper spot characteristics will cause a spot of light to appear as a virtual image on the distant target.

If the luminous source is not properly designed with respect to the source of light used to illuminate it, a "corona" may appear around the spot, making it appear enlarged and with fuzzy outlines. This gives the appearance that the spot is closer than the target, and causes the eyes to try to compensate either by changing their focus or by causing the line of sight to shift to the spot and away from the target. If the spot is too small, it will not appear as a disk, but will be of indeterminate shape, again causing the eyes to tend to shift away from the target and to the spot, in order better to determine its shape.

The spot must be of proper luminosity with respect to the target, for too dim a spot will cause the target to dominate. When this occurs, the image of the spot seen by the right eye (in the example) will tend to be ignored by the user's brain, and only the dominant target will be seen. The prior art has experienced a great deal of difficulty in developing a light source for a sight which will provide the correct amount of light under varying conditions. A light bulb may be a satisfactory source under certain conditions, and thus one embodiment of the invention proposes to use a bulb. However, it has been found that the filaments will vary from one bulb to another, both in intensity and location within the bulb envelope; thus it is difficult to obtain a luminous spot of constant intensity. Further, slight movement of the eye with respect to the sight optics will present different portions of the bulb to the small opening which is the luminous source, and this can also result in a variation in intensity, a variation which can be disturbing to the user, and can cause his eyes to focus on the spot instead of the target.

This latter problem may be overcome through the use of the diffused light source described herein, which produces a constant luminosity no matter how it is viewed, thereby assisting the shooter in maintaining concentration on the target. This source is used in combination with an aperture of specified size and shape to produce a sight that produces great accuracy and ease of use. The luminous spot is of such a size that it intersects an angle of between about 10 and 60 minutes, as viewed by the shooter. Relatively large spots are preferred for most uses, even though they may be superimposed over the entire target. However, it has been found that good accuracy can be obtained with a relatively large spot, first because it is relatively simple to center a small target in the image of the disk, and second, because the sight is primarily used for shooting a moving target such as a deer or bird, rather than marksman type shooting. Further, a very small disk is not well defined, for the eye mosaic is not capable of responding to very small shapes, and the dimensions and shape of such a source cannot be determined. The optimum size of the luminous spot will depend upon the brightness of the source. Finally, the disk must be round within a very small tolerance, or the eye will tend to reject it. If it is not round, the eye will try to change focus to make it round, and interfere with the aiming operation.

BRIEF DESCRIPTION OF THE DRAWINGS

Further objects and advantages of the invention will be apparent from the following description, reference being had to the accompanying drawings showing preferred embodiments of the invention chosen by way of example. In the drawings:

FIG. 2 is a cross-section on line A—A in FIG. 1 through one of the main portions of the sight;

FIG. 3 is a fragmentary longitudinal section on line B—B in FIG. 2;

FIG. 4 is a side view of a weapon having a sight according to FIGS. 1 to 3 mounted on it;

FIG. 5 shows roughly how the sight is used by a shooter and further shows the increased field of vision obtained by using the sight according to the invention;

DESCRIPTION OF PREFERRED EMBODIMENTS

Figure 1:
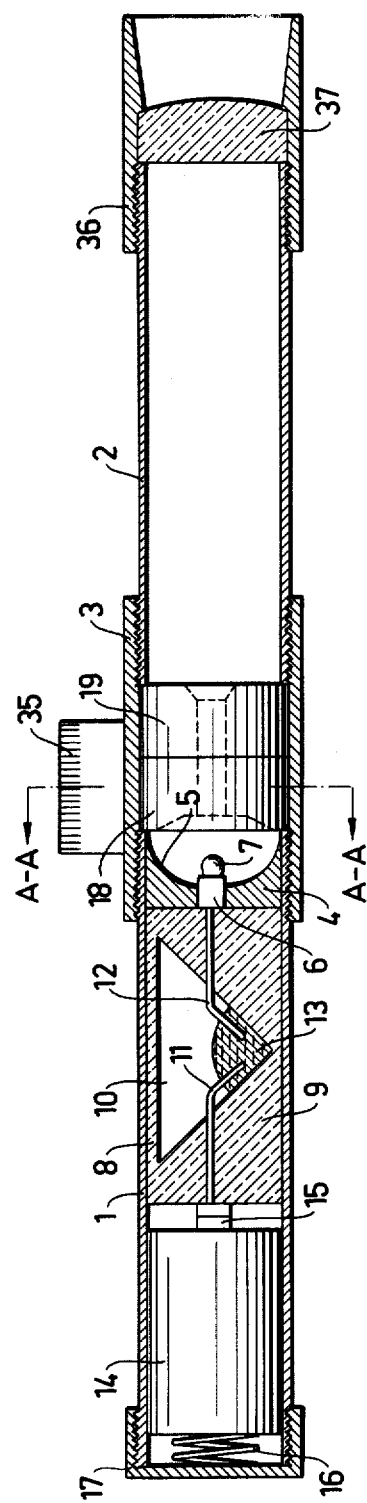
FIG. 1 is a longitudinal section of one embodiment of the sight.

The sight shown in FIG. 1 has a tubular housing which is impenetrable to light and consists of two metal tubes 1 and 2 united by an intermediate portion 3 having an exterior square cross-section and having a cylindrical bore with internally threaded ends, into which the tubes 1 and 2 are screwed with an external thread on one of their ends. The tube 1, which forms the front portion of the housing (to the left in FIG. 1) encloses means for illuminating a very small diaphragm aperture disposed behind the tube 1 in the intermediate portion 3, and the tube 2, which forms the rear portion of the housing, has a convergent lens means screwed onto its outer (rear) end for observing the diaphragm aperture which is visible as a luminous spot in the intermediate portion 3.

The illuminating means in the tube 1 comprises a circular body 4 mounted fixedly in the rear end of the tube, said body preferably being of metal and having on its side which faces towards the rear a recess with a spherical or parabolical reflecting surface 5, in the center of which there is provided a lamp-socket 6 holding a miniature bulb 7. Immediately inside the body 4 the tube 1 encloses an automatic mercury switch 8.

This consists of a composite Plexiglas body 9 having a completely enclosed angular inner caavity 10 and two wire electrodes 11 and 12 passing tightly through the Plexiglas body 9 from the ends thereof, where they are connected with contacts, and project with their points into the cavity 10. In this cavity there is a drop of mercury 13, which closes the circuit between the electrodes when the sight occupies the position shown in FIG. 1 but keeps the circuit open in all other positions. In front of the switch 8 there is a dry battery 14 of a standard type mounted in the tube 1 so that one of its end contacts 15 rests against the electrode end contact of the switch which is located exactly opposite. The battery is kept pressed against the switch by a helical spring 16 and a capsule 17 screwed onto the outer end of the tube 1.

In the intermediate portion 3 the diaphragm aperture illuminated by the bulb 7 and the reflector surface 5 is formed by a diaphragm means which not only determines the size of the aperture but also admits of close adjustment of the position of the aperture in the field of vision. This means consists of two circular plates 18 and 19 of metal having a close fit in the bore of the intermediate portion and being kept pressed against each other by the ends of the two tubes 1 and 2 screwed into the intermediate portion, one from each direction. They may also be mutually screwed together by means of a pair of screws 20 (FIG. 2). Each plate 18 or 19 has a deep diametrical groove 21 and 22 (FIG. 3), respectively, cut in that side which faces the other plate, and the plates are arranged in such relation to each other in the bore of the intermediate portion 3 that the grooves 21 and 22 are disposed at right angles to each other. In the opposite side, each plate has a central orifice extending to the respective groove and a bevelled orifice margin, the orifice in the plate 18 to the left in FIGS. 1 and 3 being slightly larger than the orifice in the plate 19. In the grooves 21 and 22, respectively, metal bodies 23 and 24, respectivley, are guided slidingly, a leaf spring 25 being provided on one side wall of each groove in order to keep the corresponding body pressed without play against the other side wall. The bodies 23 and 24, respectively, serve as holder for cylindrical glass bodies 26 and 27, respectively, which have a close fit in a through bore in the bodies 23 and 24 in the longitudinal direction of the tubular housing. The two glass bodies 26 and 27, the ends of whcih engage each other at those sides of the plates 18 and 19 which face each other, are intended to provide a path for the light falling from the bulb 7 through the central orifice in the plate 18 and emerging through the central orifice in the plate 19. The ends of the glass bodies which engage each other are coated with a layer which is impenetrable to light (not shown in the drawings) except for a very narrow diametrical slot extending in each glass body at right angles to the groove 21 and 22, respectively, in which its holder is guided. The diaphragm aperture is formed by the intersection of the two slots, and the position of the said aperture in the field of vision can be adjusted by displacing the holders 23 and 24 in their guides. In order to bring about this displacement each holder is provided with an adjustment which is accessible on the outside of the intermediate portion 3. The said adjustment means is described in the following.

Each holder 23 and 24, respectively, has on one end a pinshaped extension 28 into which the end of an adjustment screw 29 is screwed. The said screw 29 passes freely through a lateral opening in the intermediate portion 3 and is rotatably mounted in a disk 31 secured by means of screws 30 on the outside thereof. Against the outer side of the said disk 31 the head 32 of the adjustment screw 29 abuts through a friction washer 33. A helical spring 34 is mounted around the extension 28 between the end of the metal body 23 and 24, respectively, and the inside of the disk 31 in order to avoid play in the threads. A protective hood 35 is screwed onto the disk 31 in order to prevent unintentional changes of the angular position of the screw 29.

The convergent lens means screwed onto the outer end (to the right in FIG. 1) of the tube 2 consists of a tubular barrel 36 having an internal thread at one end on which the tube 2 is to be screwed and a single convergent lens 37 mounted in the said barrel. The focal distance of the said lens is adjusted in such way that the diaphragm aperture in the intermediate portion 3 is located at least approximately in the focal plane of the lens. As seen through the lens a virtual image of the diaphragm aperture will consequently be located at an infinite distance in front of the shooter.

The sight is intended to be mounted on a weapon 38 in the same way as an ordinary telescopic sight and preferably by using the same kind of fastening means (see FIG. 4).

When aiming with the aid of a sight according to the invention the shooter regards the target with his eyes accommodated to the distance to the target. When aiming the weapon at the target the eyes do not have to be re-accommodated to a short distance in order to find the aiming-line to the target, as must be done when using a rear sight and a front sight of the conventional type. The weapon is instead aimed in such a way that the luminous spot generated by the sight is placed in such a relation to the target as is called for by the speed with which the target moves, the strength and direction of the wind, the light conditions, the type of ammunition used, and other factors which affect the aim. When the shot is fired the same accommodation is retained and the marksman keeps both eyes open, whereby it is easy for him to take the right aim with the aid of the luminous spot. As a result of the adjustment means described above for the diaphragm aperture, the latter can be adjusted in such way that the weapon is aimed correctly at the target when the shooter can see the luminous spot in the desired position in relation to the target, even if the sight housing has not been given an exactly correct position on the weapon. This is made clear in FIG. 5, where the target is shown at 39 at a relatively short distance from the shooter in order to make the angle between the lines of vision of the eyes clearly visible. FIG. 5 also shows how the shooter can use the full visual angle $\gamma$ of his eye when regarding the target area, as compared to the small visual angle which is obtained for instance in telescopic sights.

Figure 6:
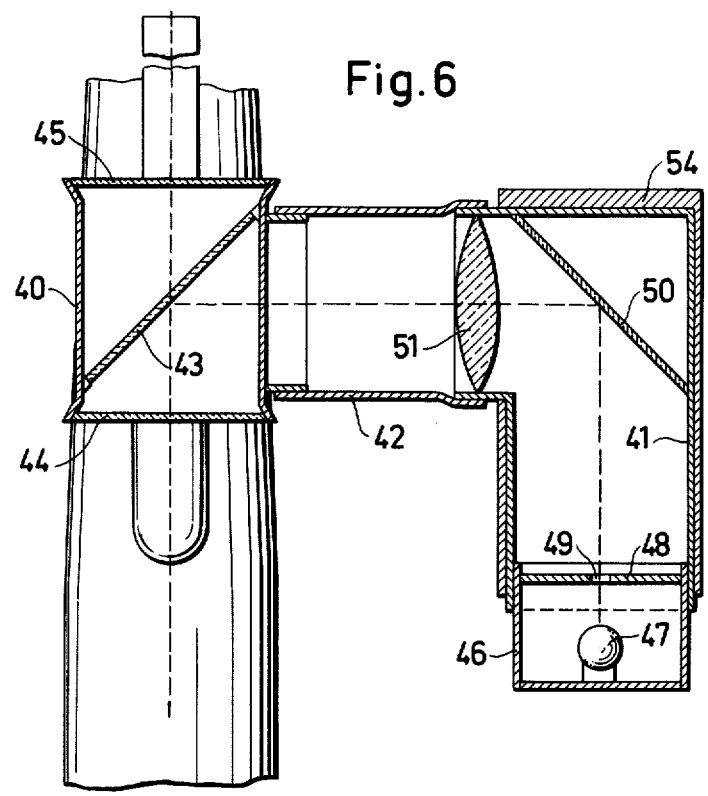
FIG. 6 is a diagrammatic horizontal section of a second embodiment of the sight according to the invention mounted on a weapon.
Figure 7:
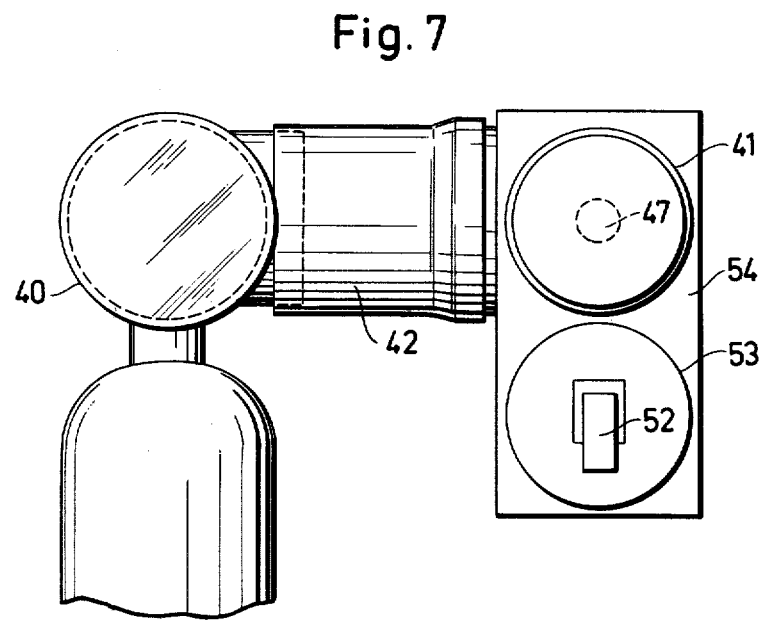
FIG. 7 is an end elevation of the said embodiment as seen from the rear.

The embodiment of the sight shown in FIGS. 6 and 7 differs from the embodiment described above in such a way that the shooter can also see the target area with the eye which regards the luminous spot. This embodiment has a housing which consists of a tube 40 arranged so as to be looked through and intended to be mounted on the weapon, an angular tube 41, at one end of which the means generating the luminous spot is located and at the other end of which the convergent lens means is mounted, and an intermediate tube 42 by means of which the end of the tube 41 which houses convergent lens means is joined to the side of the tube 40 at an area where the said tube has an opening. The tube 40 also encloses a clear glass plate 43 mounted at a 45 degree angle to its axis and to the axis of the intermediate tube 42, and its ends are preferably covered by glass plates 44 and 45. The means generating a luminous spot consists of a bottomed sleeve or socket 46 displaceable in the open end of the tube 41 and carrying in its interior at the bottom a lamp-socket for a bulb 47 and being covered in front of the bulb by a diaphragm disk 48 having a very small central orifice 49 which thus forms the luminous spot generated by said means. In the angle of the tube 41 there is provided a mirror 50 deflecting the light from the orifice 49 towards the convergent lens means which may in this case consist of a single convergent lens 51 mounted at the end of the tube 41. The said lens has a focal distance adjusted in such a way that the diaphragm aperture 49 can be made to lie seemingly in the focal plane of the lens by precision adjustment of the sleeve 46.

A battery (not shown) and a switch 52 feeding current to the bulb 47 are provided in a sleeve 53 which may be disposed beside the tube 41 in a housing 54 which is common to both of them.

When using the sight according to FIGS. 6 and 7 the shooter looks with one eye through the tube 40 and sees not only the target area but also the diaphragm aperture (the luminous spot) 49 which on account of the convergent lens 51 seems to be located at an "infinite" distance from him, like the target area. In this case the shooter may according to discretion regard the target area also with his other eye or keep this eye closed. In other respects the method of using this embodiment of the sight is the same as described in connection with FIGS. 1 to 5.

The embodiments of the sight described above can be used in various respects without departing from the essential principle of the invention. For instance it is possible to dispense with the bulb and instead use daylight, if the device is to be used during the day. In this instance, daylight can be made to illuminate the diaphragm orifice by means of a suitable optical device and thus generate the luminous spot. The third embodiment shown in FIGS. 8 and 9 is based on this principle and will now be described.

Figure 8:
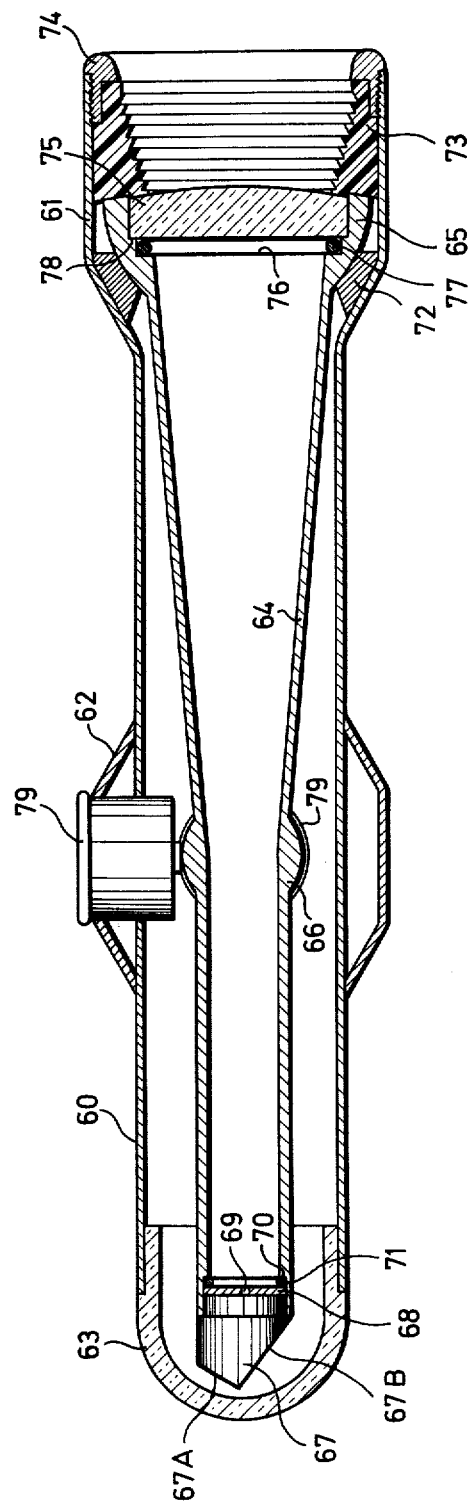
FIG. 8 is a longitudinal section of a third embodiment of the sight.
Figure 9:
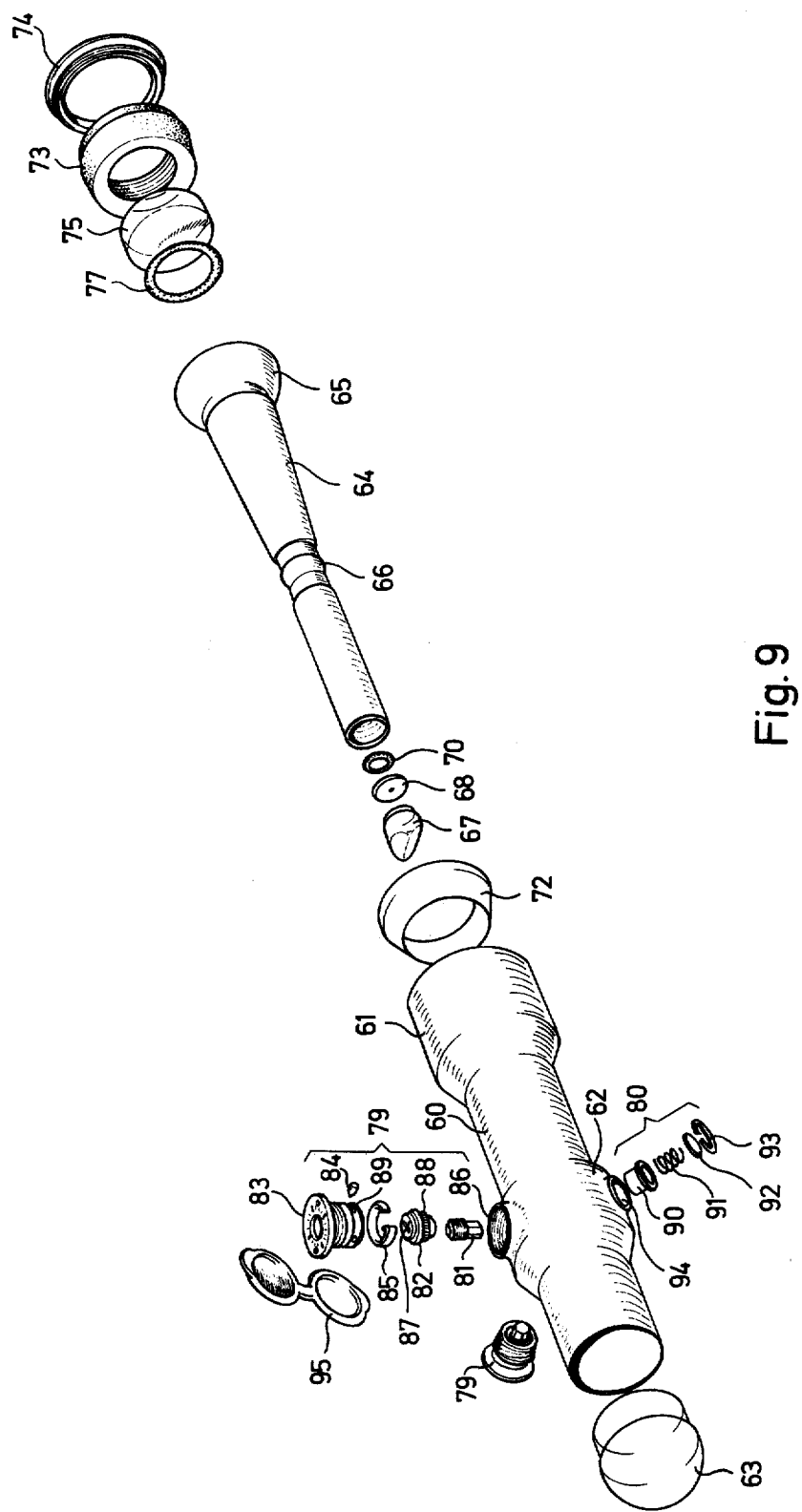
FIG. 9 is an exploded perspective view of the sight shown in FIG. 8.

The sight shown in FIGS. 8 and 9 in the drawings comprises an outer metal tube 60 which is adapted to be secured to the weapon by suitable fastening means and has an enlarged end portion 61 and an enlarged intermediate portion 62 said portions joining the rest of the tube by flaring transients. At the end of the tube opposite end portion 61 there is press fitted in said end a light permeable dome 63 of a plastic material. In tube 60 there is inserted a tubular housing 64 having at one end thereof a flaring end portion 65 and between the ends an intermediate circumferential bead 66 providing a transversely curved outer surface. At the other end of the housing 64 there is provided a light permeable element 67 to be described in more detail later. This element is press fitted in said end of the housing 64 and engages a circular diaphragm 68 having a small diameter circular or at least substantially circular aperture 69 arranged centrally therein, which is held against a shoulder 70 in the housing 64 an O-ring type sealing gasket 71 being interposed between the shoulder 70 and the diaphragm 68. The diameter of the aperture preferably should have a variation of not more than ± 5 percent.

Housing 64 is inserted into tube 60 from the enlarged end portion 61 thereof to have element 67 disposed in the interior of the dome 63 as shown in FIG. 8. The housing seats with a spherically convex annular surface on portion 65 against a spherically concave annular surface on a bearing ring 72 engaged with the inner surface of the tube 64 at the transient between the end portion 61 and the rest of the tube and is kept against said bearing ring by means of an annular eyepiece member 73 of resilient synthetic rubber bearing against the end surface of the flaring portion 65 of the housing 64 and being pressed against said surface by means of an outwardly threaded locking ring 74 engaging an inner threading on the end portion 61. Eyepiece element 73 also secures a convergent lens 75 against a shoulder 76 in the flaring portion 65 an O-ring sealing gasket 77 being disposed between said lens and a shoulder 78 in the portion 65. The lens 75 has the focal point thereof in the centre of the aperture 69 in the diaphragm 68.

The resilient pressure provided on the end of the housing 64 by the locking ring 74 over the annular eyepiece element 73 allows for angular adjustment of the housing 64 on the bearing ring 72 within narrow limits such adjustment being provided by three supports 79, 79 and 80. The supports 79 are identical and are disposed in the enlarged portion 62 of the tube 60 so as to be mutually perpendicular. The support 80 is disposed substantially on the bisectrix of the right angle between the supports 79. The three supports 79 and 80 are disposed in a common transverse plane of the tube 60, and the bead 66 is also disposed in said plane to be engaged by the supports. The identical supports 79 each comprise a push rod 81, an adjuster 82, a bushing 83, a click pin 84 and a spring 85 for biasing said click pin. The push rod 81 is of hexagonal cross sectional form and is non-rotatably axially guided in the bushing 83, the adjuster 82 being rotatable but non-displacable axially in the bushing 83 which is secured by threading engagement in an opening 86 in the portion 62. The adjuster 82 is in threading engagement with the push rod 81 and may be rotated in the bushing 83 to axially displace the push rod.

A slot 87 is provided in the adjuster 82 for facilitating such rotation. Further, the adjuster 82 has a circumferential toothing 88, and the click pin 84 is disposed in a radial bore 89 in the bushing 83 to be axially displacable therein. It is biased by the spring 85 surrounding said bushing, to engage the toothing 88 and thereby retain the adjuster 82 in the adjusted position thereof.

The support 80 comprises a plunger 90, a biasing spring 91, a spring cap 92 and a retainer ring 93. The plunger 90 is axially displacable in an opening 94 in the portion 62 of the tube 60 and is biased against the bead 66 by the spring 91 bearing at opposite ends against the plunger 90 and the spring cap 92 which is retained in the opening 94 by the retainer 93.

Thus it will be seen that the housing 64 is supported at three points by supports 79 and 80. The position of the forward end of the housing 64, having the element 67 provided therein, may be adjusted into two mutually perpendicular directions by the adjustable supports 79, the spring 91 keeping the bead 66 continuously in contact with the push rods 81 thereof and allowing for controlled adjustment of the housing 64 by the adjustment of the supports 79. A protector 95 of plastic material may be fitted over the bushings 83 of the supports 79 to protect the slots 87 thereof thereby excluding invitation to non-authorized adjustment of the supports. The adjustment thus achieved by the means just described is for the purpose to adjust the position of the diaphragm aperture in relation to the tube 60 as described in connection with the first embodiment of the invention disclosed herein. However, in the embodiment according to FIGS. 8 and 9 the position of the aperture 69 in relation to the lens 75 is not affected by such adjustment, providing more favourable optical conditions than those provided in the embodiment first described.

The element 67 collects the daylight in order to transmit the light through the aperture 69 in the diaphragm 68 against the rear end of the sight to be seen by the shooter when looking through the eyepiece 73 and the lens 75, such light being seen as a small circular luminous spot.

Aperture 69 preferably should be dimensioned to form a luminous spot of a size which will be seen under an angle of sight when observed through the optical system described, which has a value between 6 and 60 angular minutes. The cone angle of the diverging light beam emitted from aperture 69 towards lens 75 — such angle may be defined as the luminance angle — if designated v as shown in FIG. 8 should satisfy the following expression:

$$\tan \frac{v}{2} > \frac{\phi}{2F}$$

where $\phi$ is the diameter of that part of the lens 75 which is uncovered by the means holding the lens in place, and F is the focal distance of lens 75.

Element 67 is made of acryl plastic such as that marketed by Imperial Chemical Industries Limited, Welwyn Garden City, England, under the name PERSPEX 451 red. This plastic material is a luminous material which diffuses light falling onto the outer surface of the element and produces of ultraviolet light contained therein visible light and thus may be said to function as a light amplifier. The element has two surfaces 67A and 67B which are arranged in angle to each other and are disposed in such angle to the longitudinal axis of the housing 64 that they do not give a total reflection of light falling onto said surfaces in the axial direction of the housing 64. This means that the shooter does not look through the element 67 against the background which is aimed at. Light falling from all directions, even from behind the shooter, is collected by the element 67 and transmitted through the aperture 69 in the diaphragm 68. Even if the background is dark a luminous spot will be seen by the shooter.

Preferably the luminous spot is red for daylight purposes since during daylight conditions the red light is most favourably observed by the human eye and this is why a red acryl plastic is used in the element 67. However, during dark conditions a green light spot is the most favourable one to be observed by the human eye. The sight described with reference to FIGS. 8 and 9 is not usable under dark conditions since no luminous spot is produced under such conditions. In order to make the sight usable also under dark conditions a small nuclear light source may be provided in the element 67 for example in an axial bore from the inner end surface of the element. Such light source may be a SRNE BETALIGHT provided by Saunders-Roe and Nuclear Enterprises Limited, England. This light source provides a green light during dark conditions but during daylight conditions such green light is suppressed by the red light transmitted from the surroundings by element 67.

Figure 10:
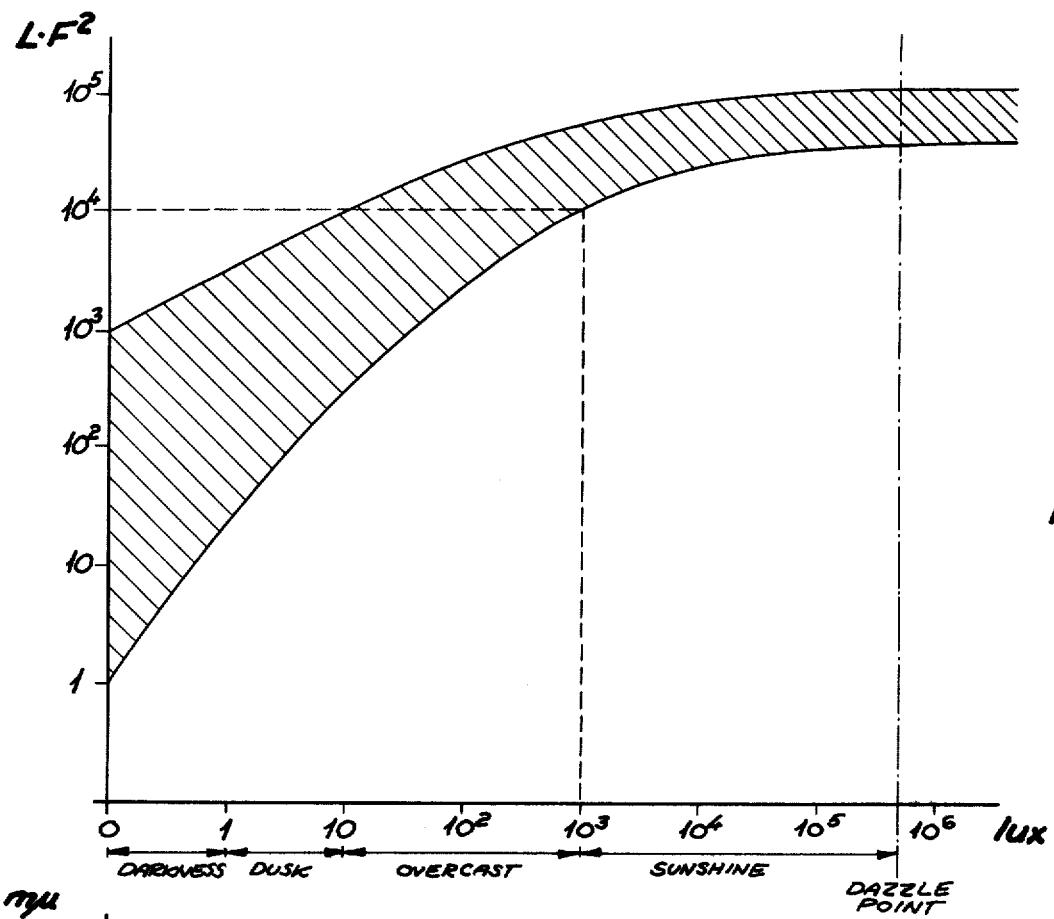
FIG. 10 is a diagram graphically illustrating the luminance of the luminous spot.
Figure 11:
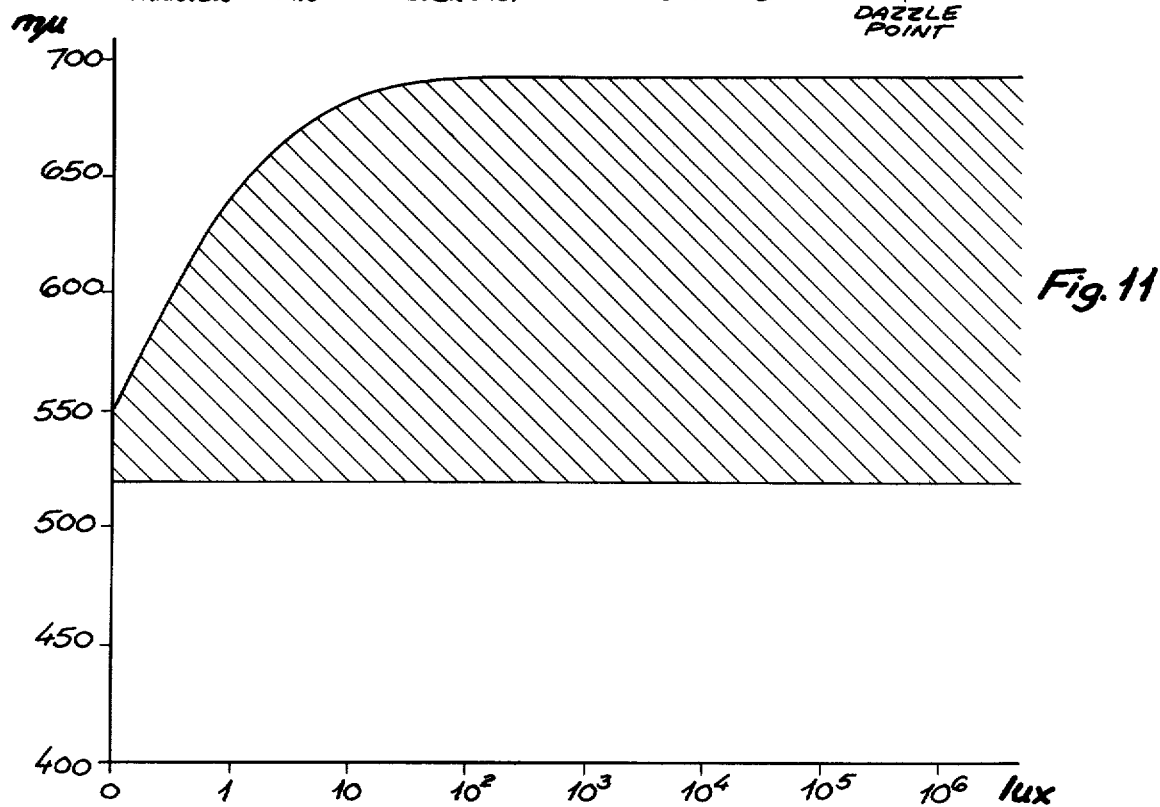
FIG. 11 is a diagram graphically illustrating the wave length of the light radiating from said spot.

Regarding the luminance and colour of the spot reference is made to the diagrams shown in FIGS. 10 and 11.

In FIG. 10 there is shown a plot of the value of the expression $L \cdot F^2$ where L is the surface luminance of the spot, in mcd/mm$^2$ as measured at aperture 69 and F is the focal distance of lens 75 in mm, vs. light intensity of the surroundings in lux. The lower curve of this diagram gives the preferred lower limit for the expression $L \cdot F^2$, and this lower limit preferably should be $10^4$ for a light intensity of $10^3$ lux. The upper curve gives the preferred upper limit for the expression $L \cdot F^2$. For darkness represented by a light intensity of the surroundings which is zero (origo), the upper limit preferably should be $10^3$. For conditions between daylight and darkness the value of the expression $L \cdot F^2$ preferably should fall within the hatched area defined by the two curves of FIG. 10.

The wave length of the light of the spot preferably should be chosen to be maximum 680 m$\mu$ for daylight conditions and 520 m$\mu$ to 550 m$\mu$ for darkness which means that the red light preferably is used during daylight conditions and the green light during darkness. However, in case a composite light source is provided as described above the light will pass through the range between 680 m$\mu$ and 520 m$\mu$ when the conditions continuously change between bright daylight and darkness and, thus, the colour of the spot will change between red and green passing through the ranges of orange and yellow light. This is graphically illustrated by FIG. 11 wherein the upper curve is a plot of the maximum wave length in m$\mu$ vs. the light intensity of the surroundings in lux starting from a wave length of 550 m$\mu$ at a light intensity of zero corresponding to darkness and raising to a wave length of 680 m$\mu$ at daylight conditions, and wherein the lower straight line is the minimum wave length in m$\mu$ vs. the light intensity of the surroundings. The hatched area defined by the curve and the straight line is the preferred range of wave lengths.

I claim:

1. A sighting device for a firearm including in combination:

a housing;

means for mounting said housing on a firearm comprising an outer tube adapted to receive said housing, said tube being closed at its forward end and open at its rearward end, bearing means within said tube for engaging and pivotally supporting one end of said housing, and adjustable supporting means within said tube for supporting said housing and for adjusting the angular position of said housing within said tube, said housing extending axially into said outer tube and forming at said rearward end of said tube an opening to be looked into by a shooter when aiming the firearm;

a light unit mounted on the forward end of said housing and comprising a light-collecting member of a luminous, light-diffusing and light-transmitting material, said light-collecting member having a substantial surface area exposed to ambient light, and being constructed to emit light of a first color from a rearwardly-facing surface when exposed to said ambient light;
said light unit further comprising light source means adapted to emit light of a second color from said rearwardly-facing surface, whereby said emitted light varies from said first color to said second color as the intensity of said ambient light varies;
aperture means in said housing providing an opening of circular configuration to form of light emitted by said light-collecting member a small luminous spot visible through said opening at the rearward end of said tube;
said adjustable supporting means for adjusting the angular position of said housing within said tube further controlling the position of said aperture means in mutually perpendicular directions in relation to the axis of said outer tube; and
convergent lens means at the rearward end of said housing in the path of the light forming said luminous spot, said convergent lens being adjusted to make a virtual image of said luminous spot at an infinite distance, as viewed through said opening.

2. The sighting device of claim 1, wherein the diameter of said opening formed by said aperture has a maximum variation from the nominal diameter length of $\pm 5$ percent around the periphery of the opening.

3. The sighting device of claim 1, wherein the luminous spot formed by said aperture means is of such a size that it will be seen under an angle of sight between 6 and 60 angular minutes when observed through said rearward opening.

4. The sighting device of claim 1, wherein the color of said luminous spot formed by said aperture means varies with the intensity of the ambient light, and the color shifting from a frequency of about 680 m$\mu$ toward a frequency of about 520 m$\mu$, as the intensity of ambient light decreases.

5. The sighting device of claim 1, wherein the frequency of the light emitted by said luminous spot is at least 520 m$\mu$.

6. The sighting device of claim 1, wherein the maximum frequency of the light emitted by said luminous spot is 680 m$\mu$.

7. The sighting device of claim 1, wherein the apparent luminance of said luminous spot formed by said aperture means has a value between 1 and $1 \times 10^3$ mcd when the light intensity of the surroundings corresponds substantially to darkness, has a maximum value of $10^4$ mcd when the light intensity of the surroundings is approximately 10 lux, has a minimum value of $10^4$ mcd when the light intensity of the surroundings is approximately $10^3$ lux, and has a maximum value of $10^5$ mcd when the light intensity of the surroundings is approximately $10^5$ lux.

8. The apparatus of claim 1, wherein said bearing means is at the rearward end of said outer tube, whereby the rearward end of said housing is pivotally secured near the rearward opening and the forward end thereof is pivotally movable within said tube.

9. The apparatus of claim 1, wherein the forward, closed end of said outer tube is transparent to ambient light, said light unit being located within the transparent portion of said tube whereby ambient light illuminates said light unit to produce said luminous spot.

10. The sighting device of claim 1, wherein said light source means is a nuclear light source located within said light-collecting member and adapted to emit light from said rearwardly-facing surface.

11. The sighting device of claim 10, wherein the intensity of said nuclear light source is such that the luminance and color of said luminous spot formed by said aperture means automatically varies with the intensity of the ambient light, the light produced by said luminous light-transmitting material predominating when the ambient intensity is high, and the light produced by said nuclear light source predominating when the intensity of the ambient light approaches darkness.

12. The sighting device of claim 11, wherein the color of said luminous spot shifts from a frequency of about 680 m$\mu$ toward a frequency of about 520 m$\mu$ as the intensity of the ambient light decreases.

13. The sighting device of claim 12, wherein the apparent luminance of said luminous spot varies with the intensity of the ambient light, the apparent luminance varying from a maximum value of $10^5$ mcd to a maximum value of $10^3$ mcd as the intensity of the ambient light decreases from about $10^5$ lux to darkness.

14. The sighting device of claim 13, wherein the value of the apparent luminance of said luminous spot is determined by the value of the product $LF^2$, where L is the surface luminance of the spot, in mcd/mm$^2$ as measured at said aperture, and F is the focal distance in mm of said convergent lens.

15. A sighting device for a firearm including in combination:
a housing;
means for mounting said housing on a firearm, including an outer tube for receiving said housing and means for adjusting the angular position of said housing within said tube, said housing and said tube having a rearward opening to be looked into by a shooter when aiming the firearm;
a light unit carried by said housing and including a light-collecting member of a luminous material having a substantial surface exposed to ambient light, said luminous material emitting light of a first color in a rearward direction;
said light unit further comprising light source means adapted to emit light of a second color from said rearwardly-facing surface, whereby said emitted light varies from said first color to said second color as the intensity of said ambient light varies;
aperture means in said housing providing an opening of circular configuration to form of light emitted by said light collecting member a small luminous spot visible through said rearward opening, the luminance of said spot varying with the intensity of the ambient light;
and convergent lens means in said housing to form a virtual image of said luminous spot at an infinite distance, as viewed through said rearward opening.

16. The device of claim 15, wherein the luminous spot formed by said aperture means is of such a size that it will be seen under an angle of sight between 6 and 60 angular minutes when observed through said rearward opening.

17. The device of claim 16, wherein said light source means comprises a nuclear light source located within said light-collecting member.

18. The device of claim 15, wherein the diameter of said aperture opening measured at any point around the periphery thereof has a maximum variation from the nominal diameter length of $\pm 5$ percent.

19. The device of claim 18, wherein said aperture opening is of such a diameter that it will be seen under an angle of sight of between 6 and 60 angular minutes when observed through said rearward opening.

20. The device of claim 15, wherein the forward end of said tube is closed by a dome-shaped cap of light-transmitting material, said light unit being received in the interior of said cap for exposure to ambient light.

21. A sighting device for a firearm including, in combination: a housing having a conical portion and a cylindrical portion, one end of said cylindrical portion joining the small end of said conical portion; outer tube means for mounting said housing on a firearm; means for pivotally mounting said housing within said outer tube including bearing means at one end of said outer tube and a bearing surface formed by said housing at the large end of said conical portion, the bearing surface on said housing being pivotally supported by said bearing means so that said housing extends axially into said outer tube and forms at said large end a rearward opening to be looked into by a shooter when aiming the firearm; resilient means fitted into said one end of said outer tube to press said bearing surface into engagement with said bearing means; a light unit mounted to said housing at the other end of said cylindrical portion, said light unit comprising a daylight collecting member of a luminous light transmitting material having a substantial exposed surface; a dome-shaped cap of light-transmitting material carried by the other end of said outer tube, said daylight collecting member being received in the interior of said cap; a diaphragm providing a central opening of at least substantially circular configuration mounted in said cylindrical portion of said housing at said other end thereof and inwardly of said daylight collecting member to form of light emitted by said light unit a small luminous spot visible through said rearward opening; means for adjusting the angular position of said housing in said outer tube to control the position of said aperture means in mutually perpendicular directions and in relation to the outer tube, said adjusting means comprising two mutually perpendicular adjustable supports and an opposite resilient support for said housing in said tube; and convergent lens means in said housing at said large end of said conical portion in the path of the light forming said luminous spot, said convergent lens being adjusted to make a virtual image of said luminous spot at an infinite distance as viewed through said rearward opening.

* * * * *